No. 834,539. PATENTED OCT. 30, 1906.
O. S. UNDERWOOD.
TRAP.
APPLICATION FILED DEC. 18, 1905.

2 SHEETS—SHEET 1.

Witnesses
J. C. Simpson
F. C. Jones

Inventor
O. S. Underwood.
By Chandler & Chandler
Attorneys

No. 834,539. PATENTED OCT. 30, 1906.
O. S. UNDERWOOD.
TRAP.
APPLICATION FILED DEC. 18, 1905.

2 SHEETS—SHEET 2.

Witnesses
J. C. Simpson
J. C. Jones

Inventor
O. S. Underwood
By Chandler & Chandler
Attorneys

UNITED STATES PATENT OFFICE.

ODE S. UNDERWOOD, OF ROSEVILLE, ILLINOIS.

TRAP.

No. 834,539.   Specification of Letters Patent.   Patented Oct. 30, 1906.

Application filed December 18, 1905. Serial No. 292,249.

*To all whom it may concern:*

Be it known that I, ODE S. UNDERWOOD, a citizen of the United States, residing at Roseville, in the county of Warren, State of Illinois, have invented certain new and useful Improvements in Traps; and I do hereby declare the following to be a full, clear, and exact description of the invention, such as will enable others skilled in the art to which it appertains to make and use the same.

This invention relates to animal-traps, and more particularly to that class in which the animal is grasped by a pair of spring-actuated jaws.

A further object of the invention is to provide a durable construction of trap which shall be efficient in action and inexpensive to manufacture.

Figure 1:
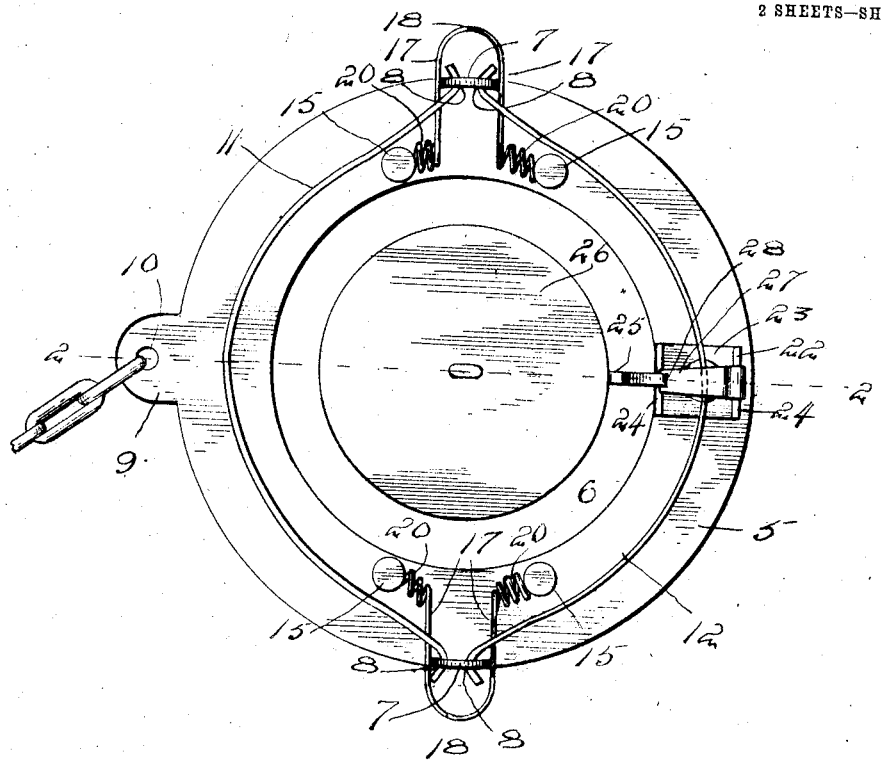
Figure 2:
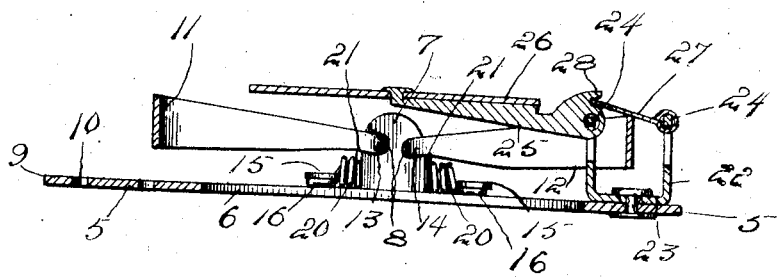
Figure 3:
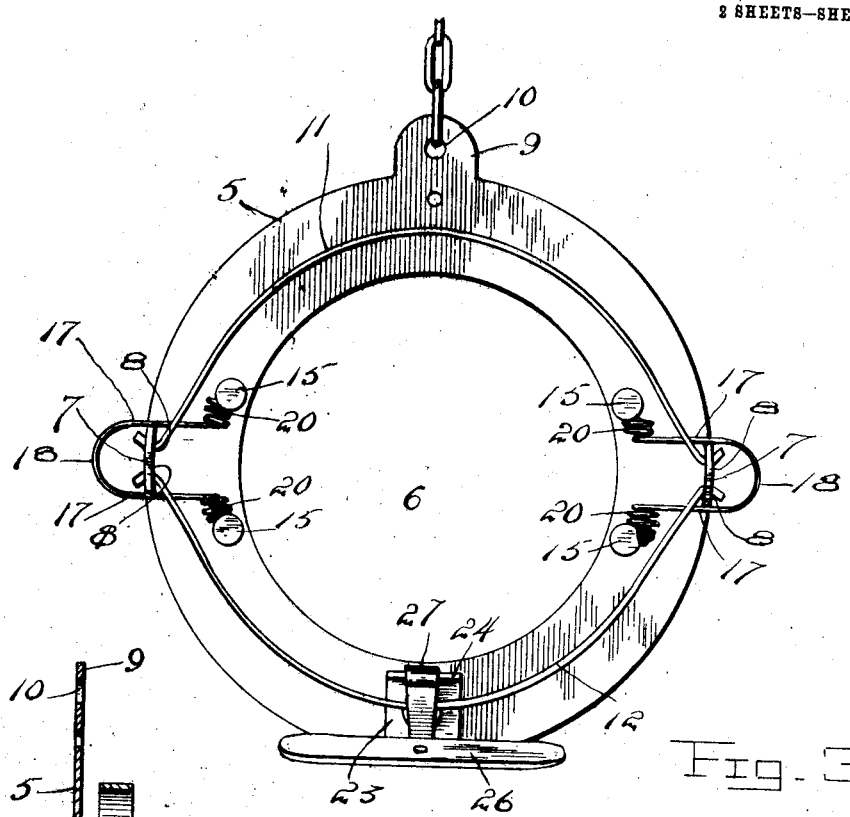
Figure 4:
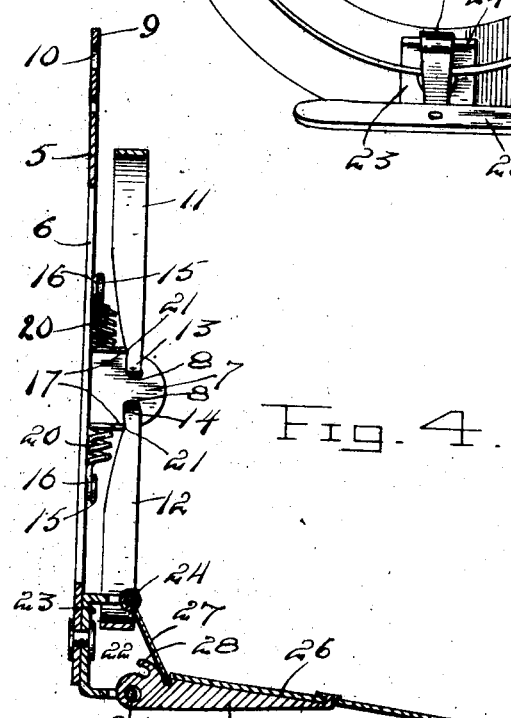

In the accompanying drawings, Figure 1 is a top plan view of my invention. Fig. 2 is a vertical sectional view on the line 2 2 of Fig. 1. Fig. 3 is a front elevation of my invention, showing a different manner of using the same. Fig. 4 is a vertical section through Fig. 3.

Referring to the drawings, the numeral 5 denotes the base-plate of the trap, which is substantially of annular form, resulting in a central opening 6. The annular base-plate 5 is provided at diametrically opposite points upon its outer edge with ears 7, each of which is provided with apertures 8, the said base-plate being provided upon its outer edge and intermediate the ears 7 with a lip 9, provided with an aperture 10 to receive a chain or other suitable securing device. Arched jaws 11 and 12 are provided with reduced ends 13 and 14, respectively, the said reduced ends being engaged in the corresponding apertures in the ears 7, whereby the said jaws are pivotally mounted.

Pins 15 are mounted upon the annular base-plate 5, one upon each side of one of the ears 7 and slightly in advance of the same, and to the said pins are secured the ends of the wire spring 16, the said spring including parallel side members 17 and a connecting bight portion 18 and being provided with coils 20 between the said side portion 17 and the ends of the spring. The normal tendency of the spring is toward vertical movement, and the end portions of the pair of jaws 11 being disposed between the side members 17 of the spring the said jaws also have a tendency toward vertical swinging movement toward each other.

As shown in Fig. 4, the meeting edges of each of the jaws are straight, while their opposite edges are notched, as at 21, at their point of contact with the side members 17 of the spring, the said edges of the jaws being inclined from said notch to the main outer edge of the jaw to increase the rapidity of action of the said jaws.

Upon the upper face of the annular base-plate 5, at a point diametrically opposite to the lip 9, is mounted a bracket 22, which includes a base portion 23 and apertured ears 24, which extend upwardly from said base-plate at opposite ends of the same. An arm 25 is pivoted to one of the ears and extends inwardly toward the center of the opening 6, and upon the upper edge of said arm is mounted a plate 26. Pivoted in the aperture in the other of the ears 24 is a detent 27, which is arranged to engage with its free end beneath a lug 28, formed on the upper edge of the arm 25.

In operation one of the jaws is forced back between the ears 24 of the bracket and the detent 27 is engaged over the said jaw and under the said lug on the arm 25. This serves to depress the spring and allows the other jaw to assume substantially the same position upon the opposite side of the trap. From the foregoing it will be seen that an animal treading upon the plate 26 will have its neck caught between the jaws of the said trap.

The trap, when used as in Figs. 3 and 4, is hung in front of a hole in the ground, so that an animal leaving the said hole will tread upon the plate 26, thereby springing the said jaws.

What is claimed is—

1. In a device of the class described, a base-plate, a spring secured at its end to said base-plate and including side members, and a connecting bight portion, said spring being coiled intermediate its ends and the said side members, jaws pivoted to said base-plate and having their end portions engaged between the said side members of said spring, and a detent arranged to hold one of said jaws in position to be sprung.

2. A device of the class described comprising a base-plate, jaws pivoted to the base-plate, a spring arranged to force the said jaws together, a trigger element pivoted to the base-plate to lie beyond the jaws, and a detent pivoted to the base-plate and arranged for engagement over one of said jaws and with said trigger element.

3. In a device of the class described, a base-plate, a spring secured at its end to said base-plate and including side members, and a connecting bight portion; jaws pivoted to said base-plate and having their end portions engaged between the said side members of said spring, and a detent arranged to hold one of said jaws in position to be sprung.

In testimony whereof I affix my signature in presence of two witnesses.

ODE S. UNDERWOOD.

Witnesses:
 DON V. UNDERWOOD,
 RUFUS LANCE.